Patented Jan. 5, 1932

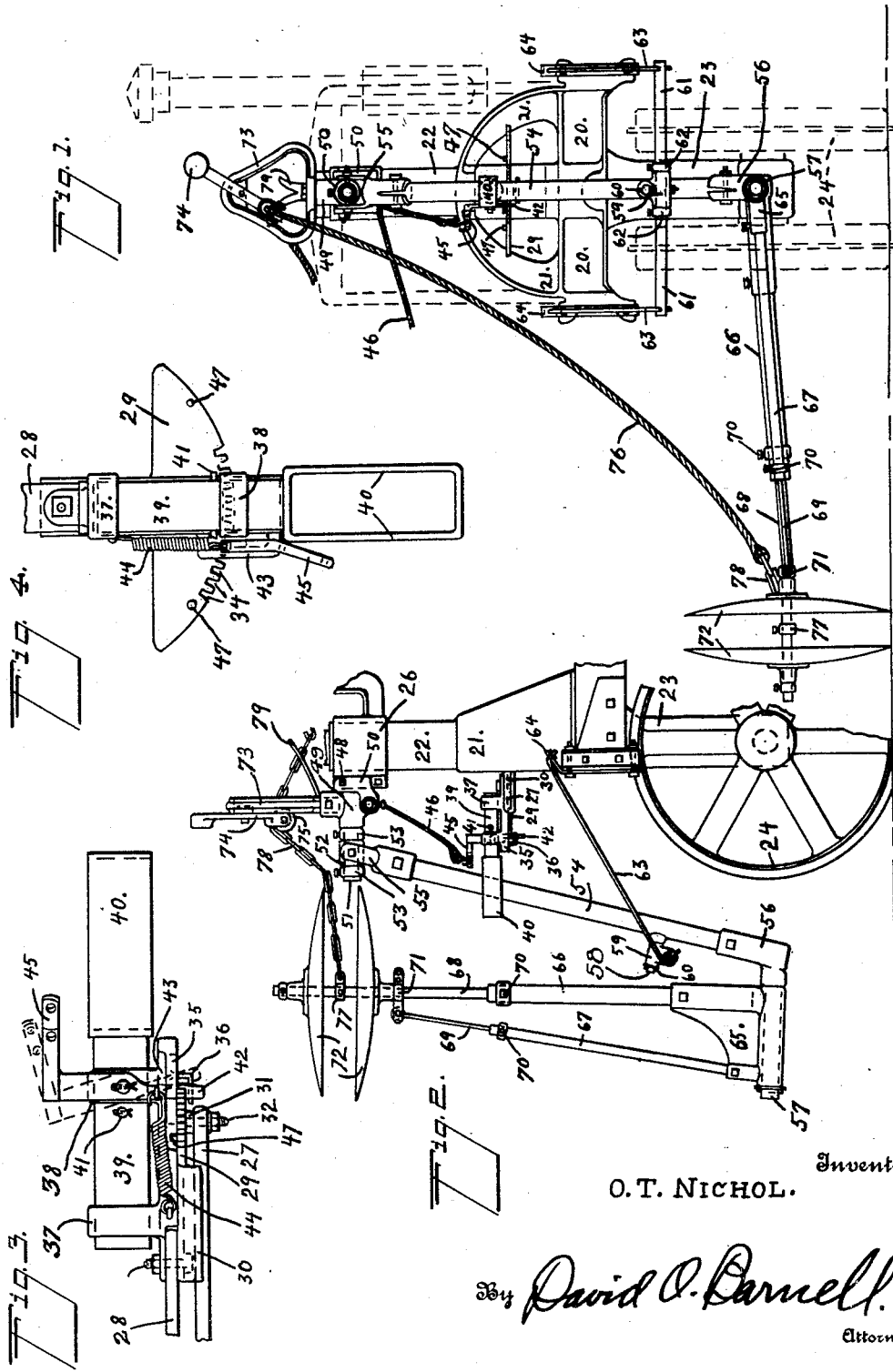
Jan. 5, 1932.                O. T. NICHOL                1,840,123
                              TRACTOR GUIDE
                           Filed March 6, 1931        4 Sheets-Sheet 1
Inventor
O. T. NICHOL.
By David O. Barnell
Attorney

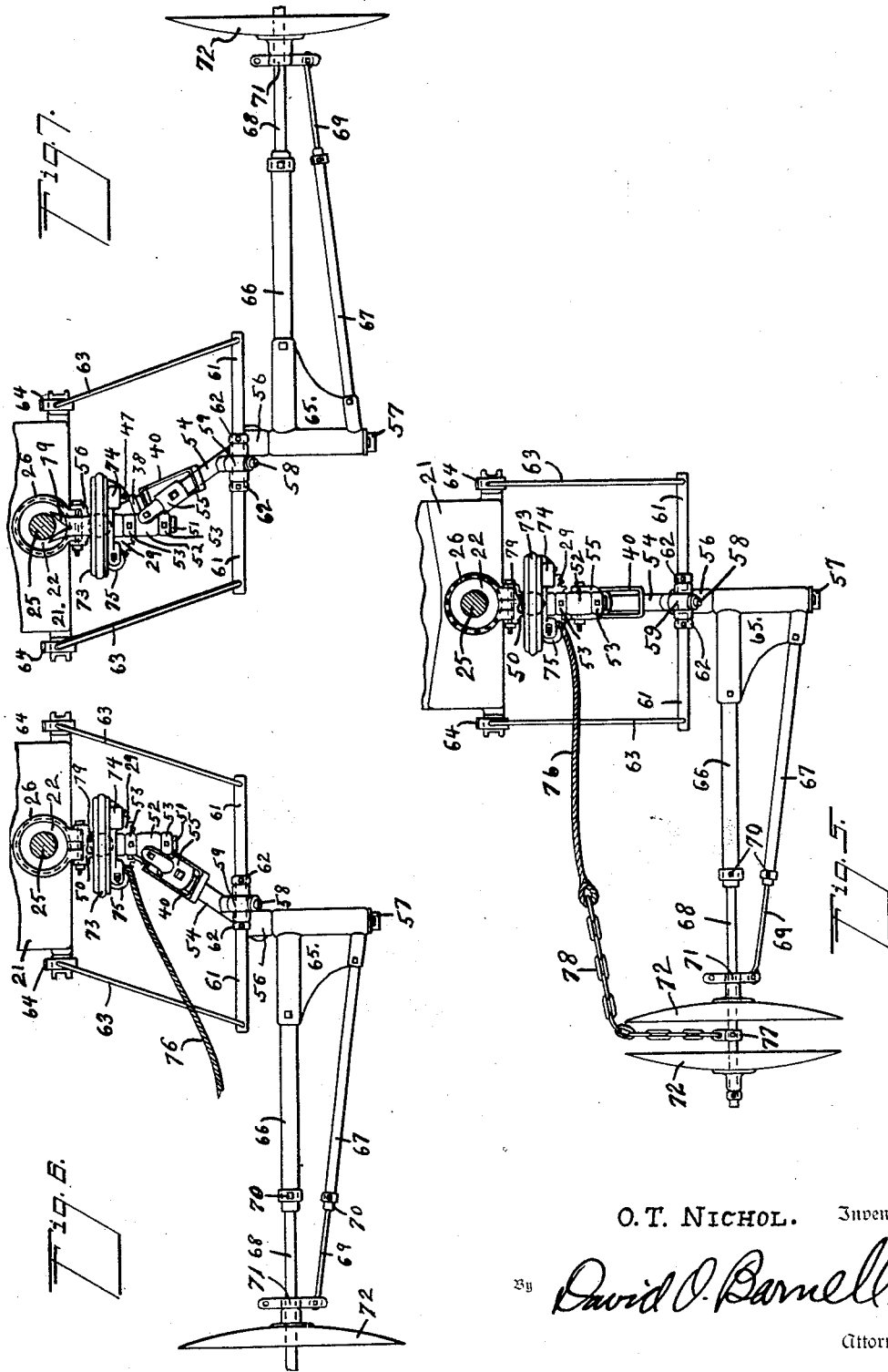

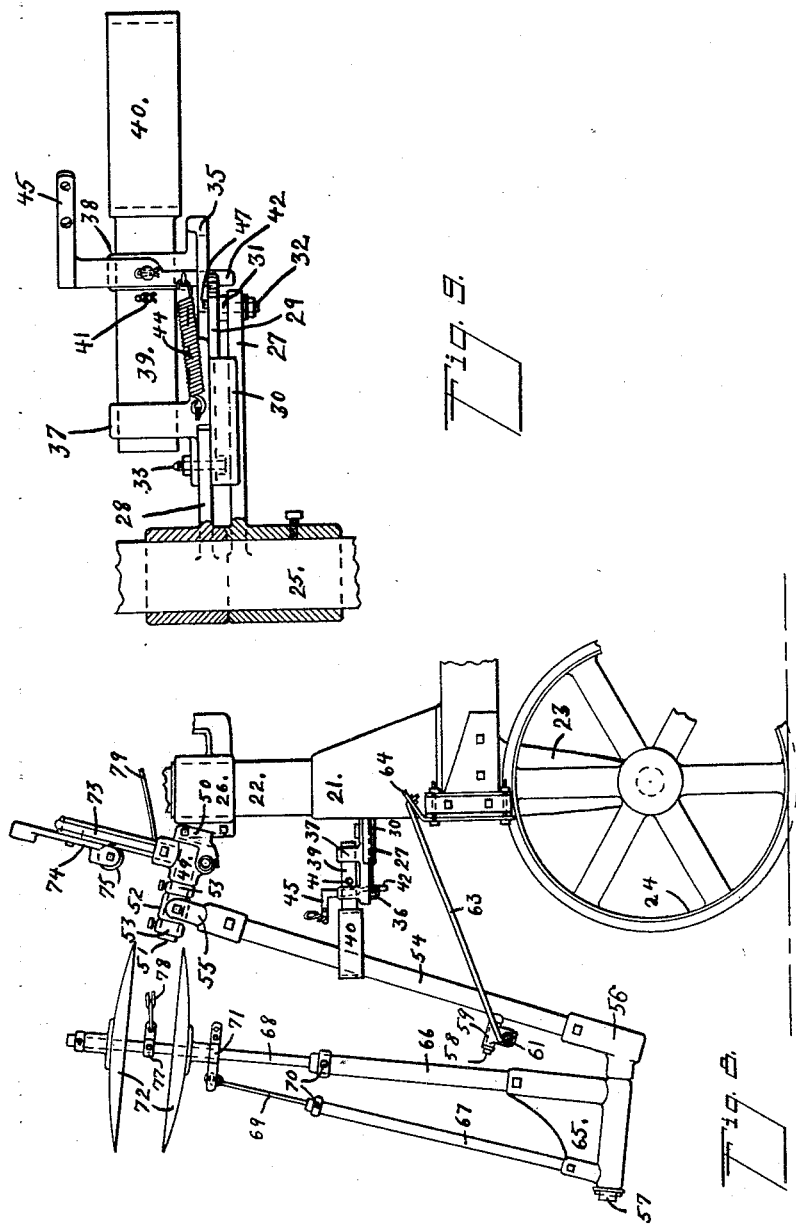

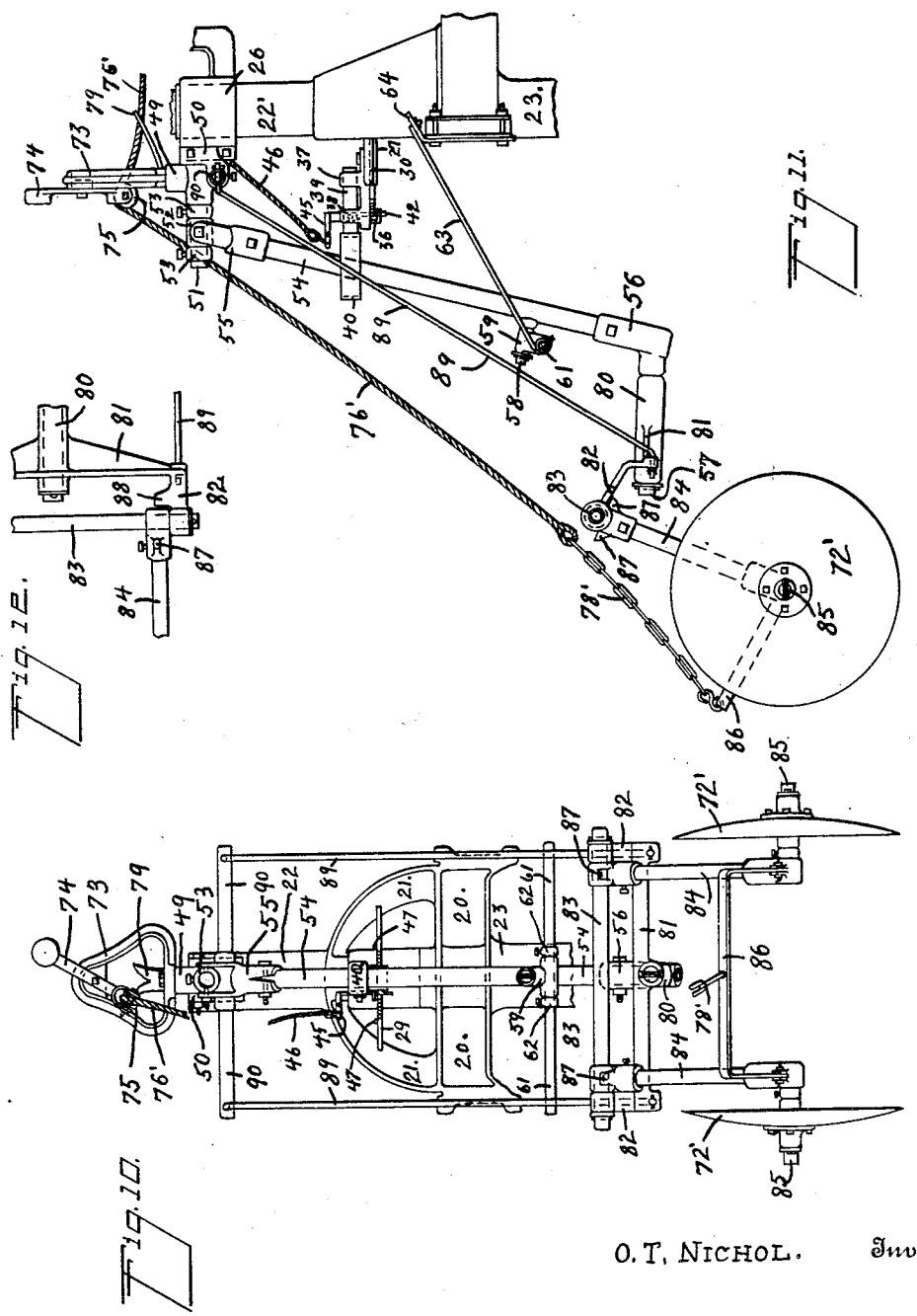

1,840,123

UNITED STATES PATENT OFFICE

ORR T. NICHOL, OF OMAHA, NEBRASKA, ASSIGNOR TO NICHOL MANUFACTURING COMPANY, A CORPORATION OF NEBRASKA

TRACTOR GUIDE

Application filed March 6, 1931. Serial No. 520,603.

My invention relates to automatic guiding attachments for tractors of the class in which the manual steering of the vehicle is effected by turning about a vertical axis a narrow front truck disposed centrally of the forward portion of the tractor-frame. It is the object of my invention to provide for tractors of this class a simple, inexpensive, durable and efficient automatic guiding device, for use with the tractor when the same is employed for pulling plows, cultivators, listers, and other agricultural implements which produce, or operate over ground having, furrows or ridges which may be engaged by pilot-members to control the guiding means. A further object of my invention is to provide, for tractors of this class, an automatic guiding attachment which may be quickly and easily applied to and removed from the tractor. A further object of my invention is to provide a tractor-guide in which the pilot-members may be reversed or changed from one side of the line of travel to the other, or elevated to an inoperative position, and in which the guide mechanism may be adjusted, to vary the relation of the line of travel to the guiding furrow or ridge, while the tractor is in operation, and without requiring the operator to dismount from the seat of the tractor to effect such adjustments. A further object of my invention is to provide a tractor guiding device having a minimum extension in front of the tractor-frame and wheels, whereby to enable the tractor to closely approach fences or other objects without interference of the guiding device therewith.

In the accompanying drawings Fig. 1 is a front view of mechanism embodying my invention, the pilot-members being laterally extended, Fig. 2 is a side view of the same, with the pilot-members in elevated position, Fig. 3 is a detail side view of the adjusting devices for varying the lateral extension of the pilot-members, Fig. 4 is a detail plan view of the same, Fig. 5 is a plan view of the guide mechanism in normal centered position, Fig. 6 is a plan view of the same with the pilot-members adjusted for lateral extension greater than normal, Fig. 7 is a similar view showing the opposite lateral adjustment, Fig. 8 is a side view showing the guide mechanism raised by tilting about the support-bracket, Fig. 9 is a side view, partially in section, of the adjusting means connecting the pilot-members and the axle-shaft of the tractor, Fig. 10 is a front view showing the guide mechanism equipped with cultivating attachment, Fig. 11 is a side view of the same, and Fig. 12 is a detail partial plan view of the cultivating guide attachment.

Tractors of the class with which my guiding attachment is adapted for use, have a rigid frame-structure of which the front end is formed by a cross-member or bolster comprising a lower horizontal portion 20, an arched upper transverse portion 21, a central vertical tubular portion 22 carried by the arched transverse portion 21 and extending upwardly therefrom, and a vertical central tubular portion 23 carried by the lower horizontal portion 20 and extending downwardly therefrom. Beneath the portion 23 of the bolster is the short front axle on which the front wheels 24 are mounted revolubly, and rigidly connected with said axle is the vertical axle-shaft 25 which extends through suitable bearings disposed within the tubular bolster-members 22 and 23. The manual steering means for the tractor is connected with the upper end of the axle-shaft 25, portions of said steering means being carried by a bracket 26 which is clamped about the upper portion of the tubular bolster-member 22. Secured upon the axle-shaft 25, intermediate the bolster-members 22 and 23, is a shifter-lever or arm 27 which extends forwardly, and above the hub portion of said arm there is a collar or spacer which has a short arm 28 extending horizontally slightly above the arm 27. The ends of said arms 27 and 28 are slotted longitudinally, and, in the use of my guiding mechanism upon the tractor, the arm 27 is employed for turning the axle-shaft 25 to effect the desired guiding of the vehicle.

In the illustrated structure there is secured to the shifter-arm 27 a plate 29, of which the rear portion extends beneath the arm 28 and has side flanges 30 which fit over the sides of the arm 27 to hold the plate in alinement therewith. On the lower side of the plate 29, adjoining the front end of the arm, is a boss 31 which holds the plate slightly above the arm, and a bolt 32 extends through said boss and through the slotted end of the arm to secure the plate fixedly thereon. Near the rear end of the plate is a bolt 33 of which the head is between the plate and the arm 27, and which extends through the slot in the end of the arm 28 and thereby retains said arm in register with the arm 27. The front portion of the plate 29 extends laterally and forwardly from the arm 27 and has an arcuate edge curved concentrically with the bolt 33 and provided with a series of notches 34, as best shown in Fig. 4. Connected pivotally with the bolt 33, and resting slidably upon the plate 29, is a socket-member 35 having beneath the front portion thereof an L-shaped lug 36 extending about the front edge of said plate 29 as a guide for the socket-member during lateral swinging movements thereof. On the upper side of the socket-member are a pair of annular lugs 37 and 38 having a common horizontal axis, said lugs forming a socket or bearing in which is held rotatably a cylindrical stem 39 formed integrally with the guide-head 40. The latter is a rectangular longitudinally slotted body extending forwardly from the stem 39 and normally alined with the arm 27. The stem 39 is retained in the socket by means of a transverse pin 41 extending through the stem behind the annular lug 38. Upon the side of said lug 38 is pivoted a latch-member 42 of which the lower portion extends through a guide 43 on the side of the socket-member and is normally held in engagement with one of the notches 34 in the plate 29 by means of a spring 44 connected therewith as shown in Figs. 3 and 9. The upper portion of the latch-member has a horizontal arm 45 extending forwardly therefrom, and to said arm is connected a flexible cord or line 46 which is passed through suitable guides to a position accessible to the operator of the tractor, so that by tension upon the cord the latch-member may be tilted, as shown by dotted lines in Fig. 3, to disengage the same from the notches 34 in the plate 29. When the latch is thus disengaged, the socket-member may swing about the axis of the bolt 33 to limits at which it engages stop-pins 47 on the plate 29, and when the latch is engaged in one of the notches 34 the socket-member is held in fixed relation to the plate 29 and arm 27, so that the latter and the axle-shaft 25 may be actuated by lateral swinging of the head 40.

The collar portion of the bracket 26 has at the front side thereof vertical flanges through which clamp-bolts 48 extend transversely. In front of the bracket 26 I provide a head-block 49 having at the rear side thereof parallel vertical flanges 50 which straddle said flanges of the bracket-collar, and the upper of the clamp-bolts 48 is passed through said flanges 50 to pivotally connect the head-block with the bracket. Carried upon the head-block and extending forward horizontally therefrom, is a pin or stud 51 on which a swivel-ring 52 is held rotatably between a pair of fixed collars 53. Extending diagonally downward and forward from the swivel-ring, and passing through the longitudinal slot or opening in the guide-head 40, is a tubular boom or guide-beam 54 having at the upper end thereof a forked head 55 which straddles the swivel-ring and is pivotally connected therewith to swing about an axis transverse to the axis of said ring. At the lower end of the boom 54 is an elbow 56 from which a tubular arm or nose-piece 57 extends forward horizontally. On the lower intermediate portion of the boom a short stud or pin 58 is affixed to and extends forwardly therefrom, and upon said stud is pivotally mounted a swivel-block 59 which is retained thereon by a cotter-pin 60 extending through the front end of the stud, as shown. The block 59 has a transverse tubular portion in which the intermediate portion of a tubular cross-bar 61 is held rotatably by means of collars 62 secured to said cross-bar adjoining the swivel-block. Parallel brace-rods 63 are connected pivotally with the ends of said cross-bar 61, and extend therefrom diagonally upward and rearward, the upper ends of said rods being pivotally connected with brackets 64 secured to the tractor-frame at the ends of the lower portion 20 of the bolster. The tractor-frame and the brackets 64, together with the cross-rod 61 and brace-rods 63, form a jointed parallelogram which allows transverse movements of the cross-bar while the same remains parallel with the bolster, and the swivel-block 59 is thus constrained to a slightly arcuate path of movement, substantially in the diagonal plane of the rods 63. Said rods 63 and the cross-bar 61 thus serve to hold the boom 54 in a forwardly inclined position, so that the lower portion thereof will clear the wheels 24, while permitting lateral swinging movements of said boom in an inclined plane, the path of the boom as a whole being in a conoid surface having its apex in the swivel-ring 52.

On the nose-piece or member 57 which extends forwardly from the lower end of the boom 54, there is pivotally mounted the head 65 of the pilot-beam. The latter is formed by a pair of convergent tubular arms 66 and 67 affixed to and extending laterally from the head 65, and rods 68 and 69 fitting telescopingly in the arms 66 and 67, respectively, and secured in adjusted relations therein by screws 70. The outer end of the rod 69 is connected with a collar 71 secured on the rod 68, and the latter is extended to form an axle for the disks or pilot-wheels 72 which are mounted revolubly on the outer terminal portion of said rod. The pilot-beam as a whole is swingable in a transverse vertical plane, about the axis of the nose-piece 57, to extend to either side of the tractor, for engaging the wheels 72 with a guiding furrow or ridge at the respective side of the line of travel.

Secured to the head-block 49 and extending upwardly therefrom is the hoist-head which comprises an approximately triangular open frame 73 having pivotally mounted at the upper part thereof a counterbalanced laterally swingable arm 74, the lower portion of said arm being forked to receive a small sheave 75. A flexible hoisting member, such as a rope or cable 76 is extended from a point accessible to the operator of the tractor, passing through the frame 73, over the sheave 75, and thence to a collar 77 on the rod 68. The terminal portion of the flexible hoisting member is preferably formed by a chain 78, and a V-slotted plate 79 is extended rearwardly from the lower portion of the hoist-head, so that when said chain is drawn up over the sheave 75 a link of the chain may be detachably engaged with said plate by dropping the chain through the V-slot in a manner which will be obvious. By swinging of the counterbalanced arm 74 about its pivotal axis, the axis of the sheave may remain constantly at right angles to the plane of the flexible hoisting member, so that the sheave will turn freely as the hoisting member is drawn over the same.

In the normal operation of the guide mechanism, the latch 42 is engaged in a notch 34 of the plate 29, such that the socket-member 35 and guide-head 40 are alined with the shifter-arm 27, and the boom 54 lies in a vertical plane, as shown in Figs. 1 and 5, when the wheels 24 of the tractor are directed straight ahead for guiding the tractor in a straight line of travel. The guiding of the tractor is effected by disposing the pilot-wheels 72 in a furrow or straddling a ridge, the pilot-beam being extended horizontally to either side of the line of travel of the tractor, accordingly as the furrow or ridge lies at the right or left side of the desired line of travel. Any lateral deviation of the guiding furrow or ridge causes a like movement of the pilot-wheels, thus pulling or pushing upon the pilot-beam to swing the boom 54 in the direction which the furrow or ridge turns, and the swinging of the boom causes a movement of the head 40 and shifter-arm 27 in the same direction. The shifter-arm 27 being fixedly connected with the axle-shaft 25, the latter and the wheels 24 are turned in the appropriate direction and to the required extent to guide the tractor in the desired path parallel with the guiding furrow or ridge. When the tractor is operated on sloping ground, or for "side-hill" work, so that by reason of the surface inclination there is a tendency for the tractor or the implement drawn thereby to deviate from the normal line of travel, such tendency is compensated in the guide mechanism by adjustment to effect a lateral swinging of the boom 54 toward the down-hill side, while the wheels 24 of the tractor are directed straight ahead. By such lateral swing of the boom 54, the distance between the pilot-wheels 72 and the center-line of the tractor is increased if the pilot-wheels are at the down-hill side, or decreased if the same are at the up-hill side, when the wheels 24 are directed straight ahead; and the result, when the pilot-wheels move in or out to normal relation to the center-line, is to turn the wheels 24 slightly up-hill, and to this compensate for the slope of the surface and maintain a normal line of travel relative to the guiding furrow or ridge. The compensating adjustment is effected by pulling on the cord 46 to disengage the latch-member 42 from the notch 34 in the plate 29, thereby permitting the socket-member to swing freely about its axis on the bolt 33, then by means of the manual steering mechanism turning the wheels 24 until the same are suitably directed to compensate for the slope of the ground-surface, and finally releasing the cord 46 and allowing the latch-member 42 to engage the adjacent notch 34 in the plate 29, whereby to retain the shifter-arm 27 and the head 40 in the adjusted relation. In Figs. 6 and 7, the socket-member and the swinging boom are shown as swung to the right and left, respectively, from the normal central position thereof represented in Fig. 5. At such times as the steering of the tractor is to be effected manually, the pilot-beam is raised to an approximately vertical position by tension upon the hoisting member 76, and engaging the chain 78 in the V-slotted plate 79, as shown in Figs. 2 and 8.

When the tractor is driven over rough ground, or across ditches or depressions into which the wheels 24 may drop and thus cause the lower portion or nose-piece of the boom to strike the ground, the upward pressure may be relieved by tilting movement of the head-block 49 about the pivot-bolt 48, whereby the forwardly projecting portions of the mechanism are raised relative to the frame structure, as shown in Fig. 8.

Referring to Figs. 10, 11 and 12, there is shown a device or attachment for use in cultivating, or any similar operation in which the drive-wheels of the tractor straddle the guiding furrow or ridge. In the use of the cultivating attachment, the pilot-beam is removed from the boom by withdrawing the head 65 from the nose-piece 57, and the head 80 of the cultivating attachment is then disposed pivotally upon said nose-piece. Arms 81 are formed integrally with and extend laterally from the head 80, and at the ends of said arms 81 are forwardly and upwardly extending brackets 82, in which are formed bearings for a transverse tubular shaft 83. Arms 84 are connected with said shaft 83 and normally extend forwardly and downwardly therefrom, said arms having at their lower ends the laterally extending axles 85 for the pilot-wheels 72' which are revolubly mounted thereon. The lower ends of the arms 84 are connected by an arched yoke 86, and to said yoke is connected the hoist-member 76'—78', by which the arms may be lifted or swung upwardly about the axis of the shaft 83, to dispose the wheels 72' temporarily at an elevated inoperative position. On the heads or portions of the arms 84 adjoining the shaft 83 are lugs 87, which are adapted to engage lugs 88 formed on the inner sides of the brackets 82, as shown in Fig. 12, to limit the swing of the arms about the shaft-axis. To the cross-arms 81, near the ends thereof, are connected pivotally the lower ends of diagonal rods 89 which extend upwardly and rearwardly in parallel relation, and at their upper ends are connected pivotally with a cross-rod 90 carried by the head-block 49. Said rods 89 retain the arms 81 in a substantially horizontal position, while permitting the lateral swing of the boom 54 during the operation of the guide mechanism.

Now, having described my invention, what I claim and desire to secure by Letters Patent is:

1. In a guiding attachment for tractors of the class having a high front frame-member and steering means including a vertical axle-shaft mounted centrally in said frame-member and having a forwardly extending shifter-arm, a swinging boom connected pivotally with the upper portion of said frame-member and extending downwardly and forwardly therefrom, pilot-members carried upon the lower portion of said boom, swinging brace-members connected pivotally with the tractor-frame and said boom and constraining the latter to swing transversely in an inclined plane, and a guide-head carried upon the shifter-arm and engaged with the swinging boom to be actuated therefrom.

2. In a structure as set forth in claim 1, means pivotally connecting the guide-head and shifter-arm, and a releasable latch device for retaining said parts in laterally adjusted relations.

3. In a guiding attachment for tractors of the class having a high front frame-member and steering means including a vertical axle shaft mounted centrally in said front frame-member and having a forwardly extending shifter-arm, a head-block mounted on the upper portion of said front frame-member, a boom connected with said head-block to swing transversely and longitudinally of the tractor-frame, said boom extending diagonally downward and forward from the head-block, pilot-members connected with the lower portion of said boom, swinging brace-members connected pivotally with the tractor-frame and the lower portion of the boom and constraining the latter to swing transversely in an arcuate path, and a guide-head connected with said shifter-arm and straddling an intermediate portion of the boom whereby the shifter-arm is actuated by the transverse swinging movements of the boom.

4. In a structure as set forth in claim 3, means pivotally connecting the front frame-member and the head-block to enable upward tilting of the latter and relieve upward pressure upon the swinging boom.

5. In a guiding attachment for tractors of the class having a high front frame-member and steering means including a vertical axle-shaft mounted centrally in said front frame-member and having a forwardly extending shifter-arm, a head-block mounted on the upper portion of said front frame-member, a boom pivoted on said head-block to swing about longitudinal and transverse axes, said boom extending diagonally downward and forward from the head-block, pilot-members carried upon the lower portion of said boom, swingable brace-members connected with said boom and constraining the same to swing transversely in a conoid path, a guide-head having a slotted portion straddling an intermediate portion of said boom, a socket-member in which said guide-head is mounted to rotate about a horizontal axis, and means connecting said socket-member with the shifter-arm whereby the later and the axle-shaft are actuated according to the transverse movement of the swinging boom.

6. In a guiding attachment for tractors of the class having a high front frame-member and steering means including a vertical axle-shaft mounted centrally in said front frame-member and having a forwardly extending shifter-arm, a boom connected pivotally with the upper portion of said front frame-member to swing about horizontal and transverse axes, said boom extending diagonally downward and forward from the pivoted end thereof, pilot-members carried upon the lower portion of said boom, swingable brace-members connected with an intermediate portion of the boom and constraining the same to maintain an inclined position while swinging transversely of the tractor-frame, a guide-head having a slotted portion straddling an intermediate portion of the boom, a socket-member in which said guide-head is mounted to rotate about a horizontal axis, means pivotally connecting said socket-member and the shifter-arm to enable relative transverse swinging movements thereof, and a releasable latch mechanism for connecting the socket-member and shifter-arm in adjusted relations.

7. In a guiding attachment for tractors of the class having a rigid frame-structure and steering means including a vertical axle-shaft mounted in the front central portion of the frame-structure and having a forwardly extending shifter-arm affixed to said axle-shaft, a horizontal plate secured to said shifter-arm and having a notched arcuate edge portion, a socket-member pivoted to said plate to swing about said notched arcuate edge, a latch-member carried by said socket-member and releasably engaged with said notched edge of the plate to retain the latter and the socket-member in adjusted relations, a guide-head having a horizontal stem rotatable within said socket-member, a boom pivotally connected with the rigid frame-structure to swing transversely thereof and engaged with said guide-head to actuate the latter by transverse swinging movement, and pilot-members carried by said boom and controlling transverse swinging movements thereof.

8. In a guiding attachment for tractors having a high front frame-structure and steering means associated therewith and including an arm swingable transversely in a horizontal plane, a head-block connected pivotally with the upper portion of the frame-structure to swing upwardly about a transverse horizontal axis, a boom connected pivotally with said head-block and extending downwardly and forwardly therefrom, swinging brace means for maintaining the inclined position of said boom during transverse swinging movement thereof, pilot-members controlling transverse swinging movements of the boom, and means connecting said boom with the arm of the steering means and adapted to communicate to the latter the transverse movements of the boom.

9. A structure as set forth in claim 8, wherein the connecting means between the boom and the arm of the steering means includes parts releasably connected in variable relation, whereby to vary the operative relation of the boom and said arm of the steering means.

ORR T. NICHOL.